(12) United States Patent
Kitajima (10) Patent No.: US 12,145,084 B2
(45) Date of Patent: Nov. 19, 2024

(54) FILTER ELEMENT AND FILTER DEVICE (71) Applicant: YAMASHIN-FILTER CORP., Kanagawa (JP)

(72) Inventor: Nobuyuki Kitajima, Kanagawa (JP)

(73) Assignee: YAMASHIN-FILTER CORP., Kanagawa (JP)

(*) Notice: Subject to any disclaimer, the term of this patent is extended or adjusted under 35 U.S.C. 154(b) by 584 days.

(21) Appl. No.: 17/490,755

(22) Filed: Sep. 30, 2021

(65) Prior Publication Data
US 2022/0016550 A1 Jan. 20, 2022

Related U.S. Application Data
(63) Continuation of application No. PCT/JP2020/017262, filed on Apr. 21, 2020.

(30) Foreign Application Priority Data
Apr. 23, 2019 (JP) ................. 2019-082077

(51) Int. Cl.
B01D 27/08 (2006.01)
B01D 35/147 (2006.01)
(Continued)

(52) U.S. Cl.
CPC ........... B01D 27/08 (2013.01); B01D 35/147 (2013.01); B01D 35/30 (2013.01); B01D 35/027 (2013.01);
(Continued)

(58) Field of Classification Search
CPC ...... B01D 27/08; B01D 35/147; B01D 35/30; B01D 35/027; B01D 2201/16; B01D 2201/301; B01D 2201/24; B01D 29/21; B01D 35/0276; B01D 2201/295; B01D 2201/4053; B01D 2201/52; B01D 29/15; B01D 29/606; B01D 29/96
See application file for complete search history.

(56) References Cited

U.S. PATENT DOCUMENTS 3,262,564 A 7/1966 Pall et al.
2017/0298881 A1 10/2017 Malgorn et al.
2018/0050285 A1 2/2018 Klein et al.

FOREIGN PATENT DOCUMENTS

JP 2005-349336 A 12/2005
JP 2006-007140 A 1/2006
(Continued)

OTHER PUBLICATIONS

Extended European Search Report issued in European Patent Application No. 20796033.7, mailed on Mar. 22, 2022 (7 pages).
(Continued)

Primary Examiner — Thuan D Dang
(74) Attorney, Agent, or Firm — Nakanishi IP Associates, LLC (57) ABSTRACT An upper plate provided on upper ends of a filtration member and an inner tube includes a tubular portion along the inner tube, a rib formed so as to protrude inward in a radial direction from an inner circumference of the tubular portion, and a hole formed in the rib. A gripping member has a protrusion portion that protrudes downward from a body portion having a thick plate shape inserted into a hollow portion of the tubular portion. When the gripping member is mounted on the upper plate, the protrusion portion is inserted into the hole.

4 Claims, 6 Drawing Sheets (51) Int. Cl.
*B01D 35/30* (2006.01)
*B01D 35/027* (2006.01)
(52) U.S. Cl.
CPC .... *B01D 2201/16* (2013.01); *B01D 2201/301* (2013.01)

(56) References Cited

FOREIGN PATENT DOCUMENTS

| JP | 2009-220045 A | 10/2009 |
| JP | 2010-149007 A | 7/2010 |
| JP | 3204806 U | 6/2016 |
| JP | 2018-511465 A | 4/2018 |

OTHER PUBLICATIONS

International Search Report issued in PCT/JP2020/017262 mailed on Jul. 14, 2020 with English Translation (5 pages).

FILTER ELEMENT AND FILTER DEVICE

CROSS-REFERENCE TO RELATED APPLICATIONS

This application is a continuation application of International Patent Application No. PCT/JP2020/017262 filed on Apr. 21, 2020, which claims priority to Japanese Patent Application No. 2019-082077 filed on Apr. 23, 2019, the entire contents of which are incorporated by reference.

TECHNICAL FIELD

The present invention relates to a filter element and a filter device.

BACKGROUND ART

Patent Document 1 discloses a filter element that includes an element portion formed in a tubular shape and an inner tube attachably/removably housed inside the element portion, and is configured to ensure easily exchanging the element portion.

CITATION LIST

Patent Literature

Patent Document 1: JP 2009-220045 A

In Patent Document 1, an inner tube that is not a genuine product is possibly mounted on the element portion.

SUMMARY OF INVENTION

One or more embodiments of the present invention provide a filter device capable of preventing use of a component other than a genuine product.

One or more embodiments of the present invention are directed to a filter element provided inside a filter case. The filter element includes a filtration member, an inner tube, an upper plate, a gripping member, a valve, and a sealing member. The filtration member having a hollow cylindrical shape has openings at both ends. The inner tube is provided inside the filtration member. The upper plate is provided on upper ends of the filtration member and the inner tube. The upper plate includes a tubular portion having a substantially tubular shape along the inner tube. The gripping member is mounted on the upper plate. The gripping member includes a body portion having a thick plate shape and a handle. The body portion is inserted into a hollow portion of the tubular portion. The handle is provided on a top surface of the body portion. The valve is provided on the body portion. The valve is disposed inside the inner tube when the gripping member is mounted on the upper plate. The sealing member is provided between the upper plate and the gripping member when the gripping member is mounted on the upper plate. The upper plate includes a rib and a hole. The rib is formed protruding inward in a radial direction from an inner periphery of the tubular portion. The hole is formed in the rib. The gripping member has a protrusion portion protruding downward from the body portion. When the gripping member is mounted on the upper plate, the protrusion portion is inserted into the hole.

According to the filter element according to one or more embodiments of the present invention, the upper plate, which is provided on the upper ends of the filtration member and the inner tube, includes the tubular portion along the inner tube, the rib formed protruding inward in the radial direction from the inner peripheral of the tubular portion, and the hole formed in the rib. The gripping member has the protrusion portion protruding downward from the body portion having the thick plate shape, which is inserted into the hollow portion of the tubular portion. When the gripping member is mounted on the upper plate, the protrusion portion is inserted into the hole. This allows preventing use of a component other than a genuine product.

Here, the filter element further includes a holding ring having elasticity formed by bending a metallic rod into an annular shape. The upper plate includes a housing portion in which the holding ring is provided. When the holding ring is provided in the housing portion with the body portion inserted into the tubular portion, the holding ring abuts on a top surface of the body portion. This makes it possible to integrate the filter element and the gripping member.

In addition to the filter element, the filer deice may include a filter case, a lid body, and a differential pressure measurement unit (differential pressure sensor). The filter case having a substantially bottomed tubular shape internally includes the filter element. The lid body is provided on the filter element and the filter case to cover an opening in an upper portion of the filter case. The differential pressure measurement unit is provided on the lid body. The lid body has a mounting hole where the differential pressure measurement unit is provided. The lid body has a first hole having one end opening to the mounting hole and a second hole. The gripping member has a third hole that communicates between a space inside the inner tube and the first hole. The second hole communicates between a space outside the filter element and inside the inner tube of the filter case and the mounting hole.

According to the filter device according to one or more embodiments of the present invention, the mounting hole where the differential pressure measurement unit is provided is formed in the lid body provided on the filter element and the filter case to cover the opening in the upper portion of the filter case. The lid body has the first hole having the one end opening to the mounting hole. The gripping member includes the third hole that communicates between the space inside the inner tube and the first hole. In addition, the lid body has the second hole that communicates between the space outside the filter element and inside the inner tube of the filter case with the mounting hole. Thus, a differential pressure sensor provided on the lid body can detect a differential pressure between the space outside the filter element and inside the inner tube of the filter case and the space inside the inner tube.

Here, the lid body may have a protruding portion internally having a hole that communicates with the first hole. The handle may have a recessed portion into which the protruding portion is inserted. The second hole may have one end opening to a lower surface of the body portion and the other end opening to a vicinity of a bottom surface of the recessed portion. As a result, a positional relationship between the lid body and the gripping member can be made constant.

One or more embodiments of the present invention is capable of reliably preventing use of a component other than a genuine product.

DESCRIPTION OF EMBODIMENTS

Hereinafter, embodiments of the present invention will be described in detail with reference to the drawings. In the present embodiment, while hydraulic oil is described as an example of liquid to be filtered, the liquid to be filtered is not limited to the hydraulic oil. Also, while the following embodiments are described with an example of a return filter, a filter device of the present invention is not limited to the return filter.

First Embodiment

Figure 1:
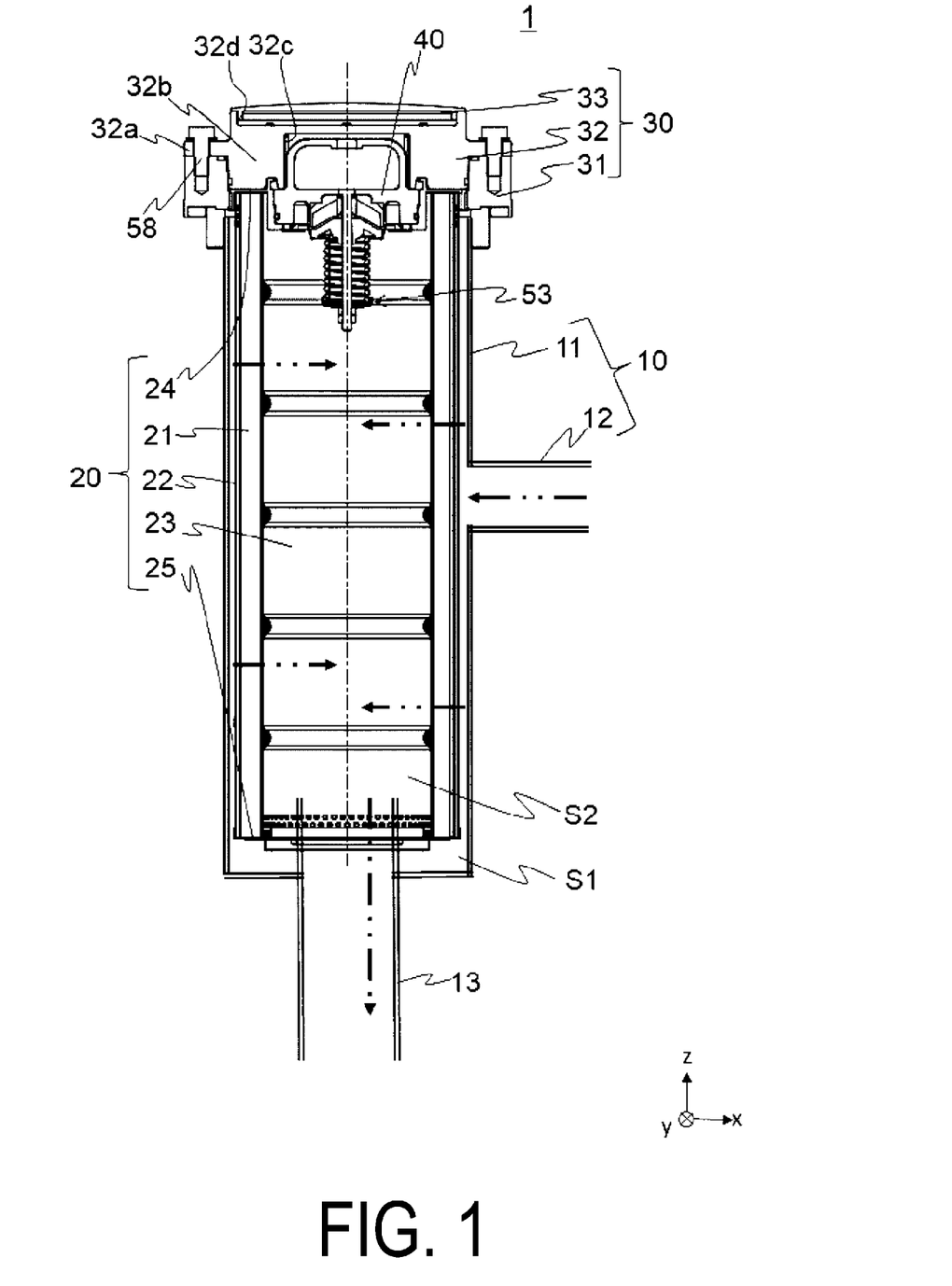
FIG. 1 is a cross-sectional view illustrating an outline of a filter device 1.

FIG. 1 is a cross-sectional view illustrating an outline of a filter device 1. In FIG. 1, hatching for indicating a cross section is omitted.

The filter device 1 removes dust or the like contained in hydraulic oil using a filtration member, and is provided inside a tank (not illustrated). The tank is a tank for storing hydraulic oil and has, for example, a box shape. The tank is installed in a work machine (not illustrated) (e.g., a hydraulic device), and is provided in a hydraulic circuit of hydraulic oil supplied to the hydraulic device. However, the tank is not limited to one provided in the hydraulic circuit.

The filter device 1 primarily includes a filter case 10, a filter element 20, a lid body 30, and a gripping member 40.

The filter case 10 is formed of a material having high corrosion resistance (e.g., a metal such as stainless steel), and primarily includes a tank body 11, an inflow portion 12, and an outflow portion 13. The filter case 10 is provided inside the tank so as to protrude from a top surface of the tank to a lower side (−z side). The inflow portion 12 is provided on the side surface of the tank body 11, and the outflow portion 13 is provided on the bottom surface of the tank body 11.

The filter element 20 is a member having a bottomed substantially tubular shape and provided inside the filter case 10. The filter element 20 primarily includes a filtration member 21, an outer tube 22, an inner tube 23, an upper plate 24, and a lower plate 25. The outer tube 22, the inner tube 23, the upper plate 24, and the lower plate 25 are integrated with the filtration member 21.

The filtration member 21 is a member having a substantially cylindrical shape and having openings at both ends. The filtration member 21 is formed by pleating a filter paper using, for example, synthetic resin or a paper, and connecting both ends of the pleated filter paper to form a cylindrical shape. The outer tube 22 where holes through which the hydraulic oil passes are formed in a substantially entire area is provided outside the filtration member 21. The inner tube 23 where holes through which the hydraulic oil passes are formed in a substantially entire area is provided inside the filtration member 21.

The outer tube 22 and the inner tube 23 are members having a substantially hollow cylindrical shape and having opening on both ends. The outer tube 22 and the inner tube 23 are formed using a material (stainless steel or resin, for example) having high corrosion resistance. The filtration member 21, the outer tube 22, and the inner tube 23 have a substantially same height. The holes formed in the outer tube 22 communicate between the outside and the inside of the outer tube 22, and the holes formed in the inner tube 23 communicate between the outside and the inside of the inner tube 23. Note that the outer tube 22 is not an essential configuration.

The upper plate 24 is provided on the upper ends of the filtration member 21, the outer tube 22, and the inner tube 23. The gripping member 40 is provided on the upper plate 24.

Figure 2:
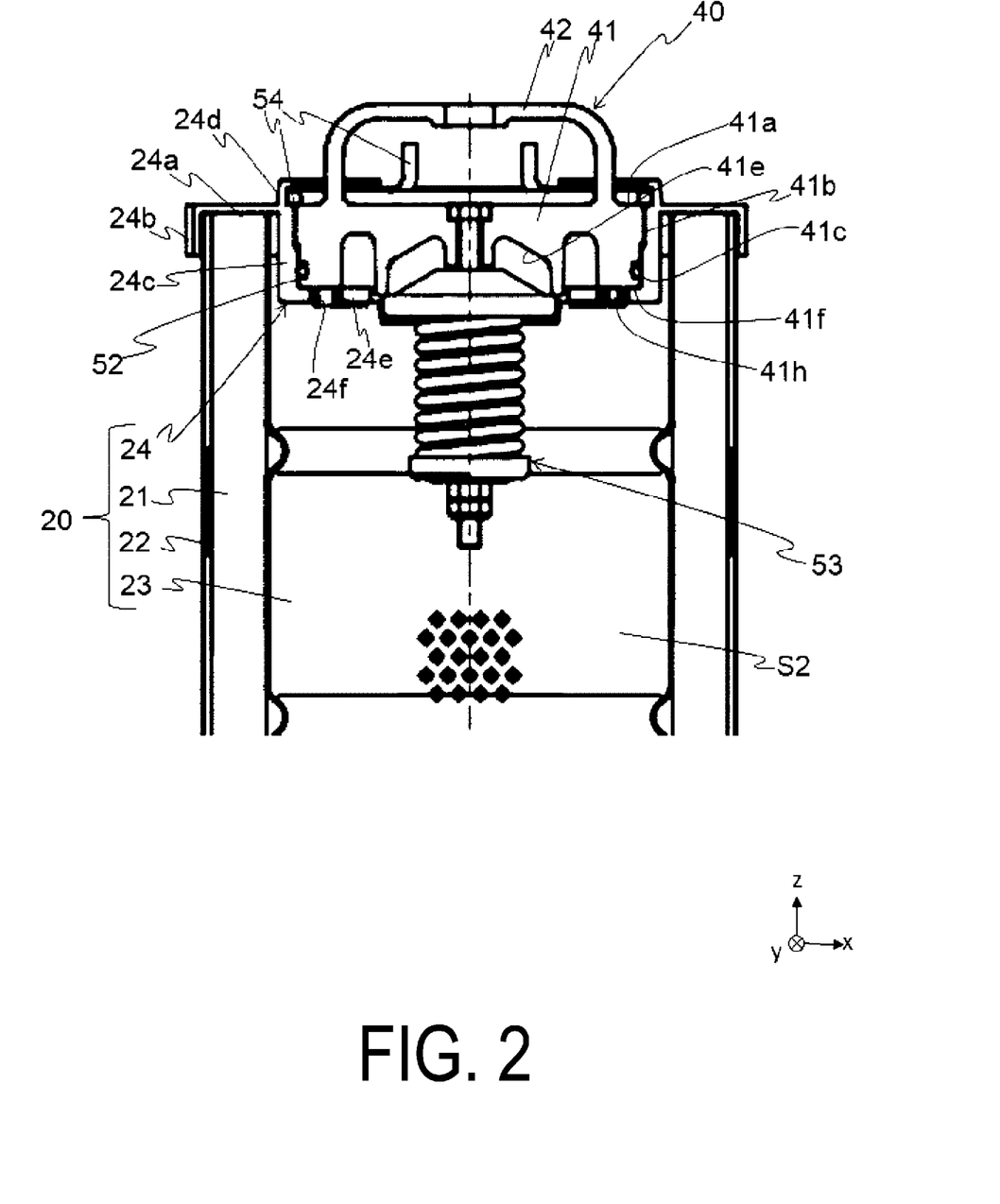
FIG. 2 is a cross-sectional view in the vicinity of an upper end of a filter element and a gripping member.

FIG. 2 is a cross-sectional view in the vicinity of an upper end of the filter element 20 and the gripping member 40. In FIG. 2, hatching for indicating a cross section is omitted.

The upper plate 24 primarily includes a plate-like portion 24a that abuts on the upper end surface of the filtration member 21, a tubular portion 24b having a substantially cylindrical shape provided on the outside of the outer tube 22 along the outer tube 22, a tubular portion 24c having a substantially cylindrical shape provided inside the inner tube 23 along the inner tube 23, and a housing portion 24d having a substantially cylindrical shape that protrudes upward (+z-direction) from the plate-like portion 24a.

The housing portion 24d is provided with a holding ring 54 having elasticity formed by bending a metallic rod into an annular shape. Both ends of the holding ring 54 are bent at approximately 90 degrees. Since the holding ring 54 has elasticity, when a force is applied in a direction in which the bent both ends are close, the holding ring 54 deforms in a direction of decreasing the diameter. In addition, when the force is removed, the shape of the holding ring 54 is restored by elasticity.

When the holding ring 54 is provided in the housing portion 24d in a state where a body portion 41 (described in detail later) of the gripping member 40 is inserted into the tubular portion 24c, the holding ring 54 abuts on a top surface 41a (described in detail later) of the body portion 41. In other words, the gripping member 40 is retained with the holding ring 54 and integrated to be removable/attachable with respect to the filter element 20 and not to be easily detached from the filter element 20. Note that the retaining of the gripping member 40 is not limited to the structure using the holding ring 54.

The gripping member 40 is a member mounted on the upper plate 24. The gripping member 40 primarily includes the body portion 41 and a handle 42.

The body portion 41 is a portion inserted into a hollow portion of the tubular portion 24c, and has a substantially circular thick plate shape in plan view, that is, a substantially columnar shape. A diameter of an outer peripheral surface 41b of the body portion 41 and a diameter of an inner peripheral surface of the tubular portion 24c are substantially the same.

A groove 41c is formed in the outer peripheral surface 41b of the body portion 41, and a sealing member (for example, an O-ring) 52 is provided in the groove 41c. When the gripping member 40 is mounted on the upper plate 24, that is, the body portion 41 is inserted into the hollow portion of the tubular portion 24c, the sealing member 52 is provided between the upper plate 24, (here, the tubular portion 24c) and the gripping member 40 (here, the body portion 41).

Insertion of the body portion 41 into the hollow portion of the tubular portion 24c elastically deforms the sealing member 51, and the groove 41c is in close contact with the outer peripheral surface 41b. As a result, the sealing member 51 integrates the upper plate 24 and the gripping member 40.

The handle 42 is provided on the top surface 41a of the body portion 41. The handle 42 and the body portion 41 may be one component, or the handle 42 may be fixed to the body portion 41 with a screw or the like.

A valve 53 is provided on a lower side of the body portion 41. When the gripping member 40 is mounted on the upper plate 24, the valve 53 is provided inside the inner tube 23. The valve 53 opens when a pressure in a space S1 (see FIG. 1) becomes larger than a predetermined value. The valve 53 is well known, and thus, detailed description of the valve 53 is omitted.

The body portion 41 has a hole 41e. When the valve 53 opens, the hole 41e communicates between a space (space S2) inside the inner tube 23 and the space (the space S1, see FIG. 1) inside the filter case 10 and outside the filter element 20.

Figure 3:
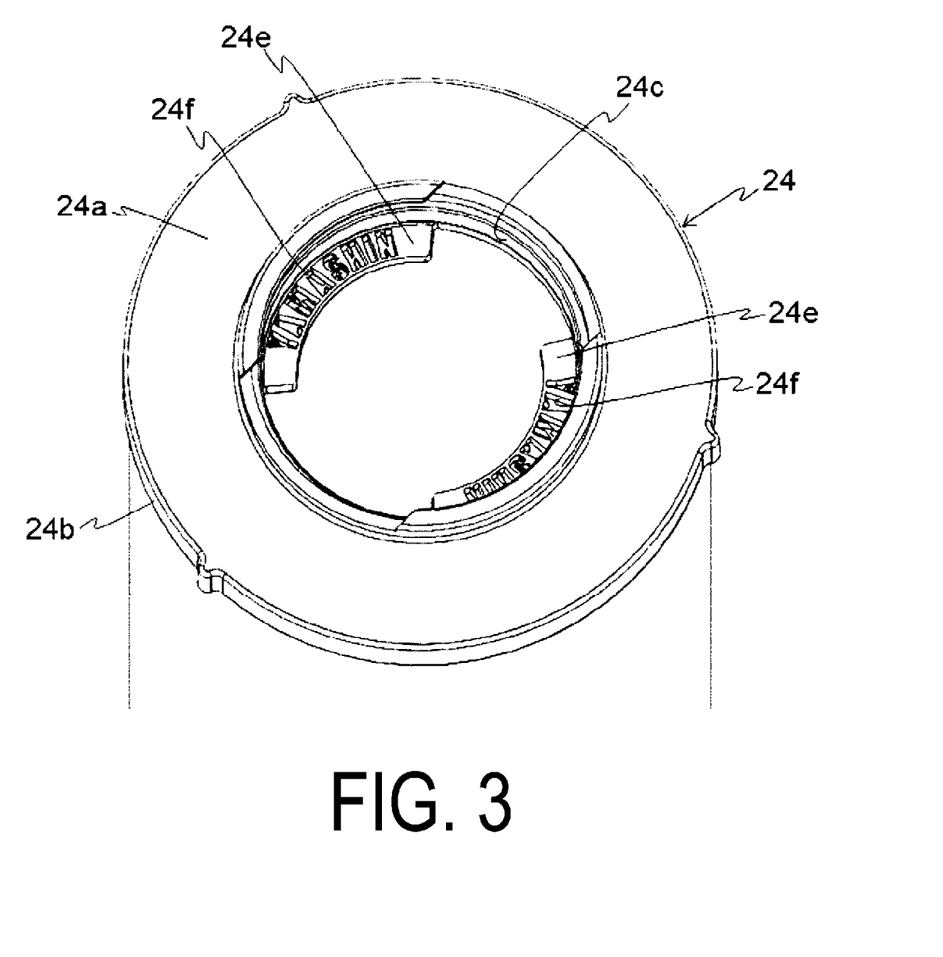
FIG. 3 is a perspective view of an upper plate.

FIG. 3 is a perspective view of the upper plate 24. Rib-shaped projection portions 24e protruding inward in a radial direction are provided on the tubular portion 24c. The projection portions 24e are provided in the vicinity of the lower end (the end on the −z side) of the tubular portion 24c. The plate-shaped projection portions 24e are formed at two opposed locations. The projection portion 24e has a plurality of holes 24f. The holes 24f will be described in detail later.

Figure 4:
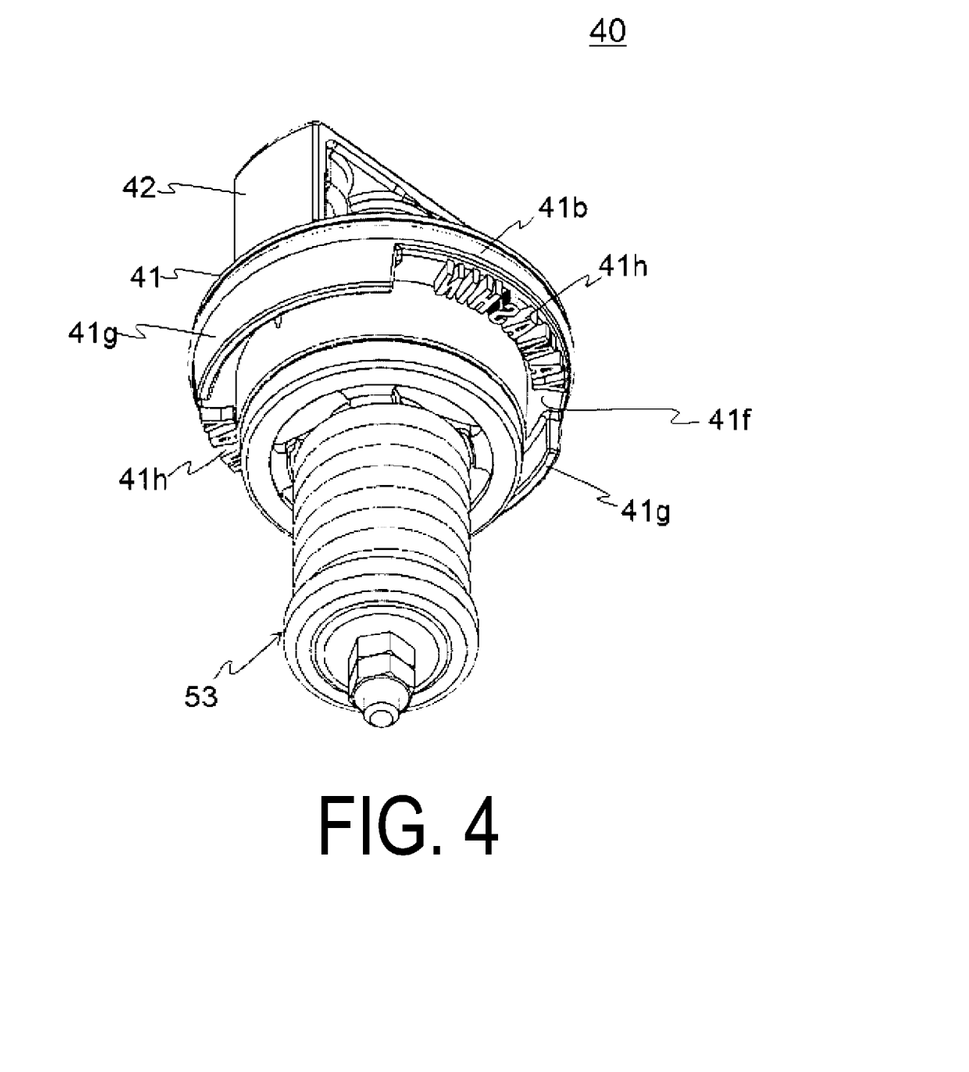
FIG. 4 is a perspective view of the gripping member.

FIG. 4 is a perspective view of the gripping member 40. A lower surface 41f of the body portion 41 is a surface that abuts on the projection portions 24e when the body portion 41 is inserted into the hollow portion of the tubular portion 24c, and the lower surface 41f has ribs 41g and projections 41h that protrudes downward (the −z direction).

The projections 41h have a shape, for example, representing characters. In the present embodiment, there are 16 projections 41h (eight×two sets), and, for example, the projections 41h include shapes of characters "Y", "A", "M", "S", "H", "I", and "N" or representing their mirrored image shapes.

The projections 41h are inserted into the holes 24f formed in the projection portions 24e. In other words, the projections 41h and the holes 24f have corresponding shapes. In the present embodiment, the holes 24f have shapes including characters "Y", "A", "M", "S", "H", "I", and "N" or their mirrored image shapes.

When the body portion 41 is inserted into the hollow portion of the tubular portion 24c, the lower surface 41f abuts on the projection portions 24e, and the projections 41h are inserted into the holes 24f (see FIG. 2). Also, the rib 41g is located between the two projection portions 24e.

Note that the shapes of the holes 24f and the projections 41h are not limited thereto. The plurality of holes 24f and the projections 41h may have shapes representing at least one of characters, symbols, and patterns, and their mirrored image shapes. For example, the holes 24f and the projections 41h may be characters, shapes, or the like of a company name and a registered trademark of a company who, for example, manufactures or sells the filter elements 20 or hydraulic actuators into which the filter elements 20 are incorporated or their mirrored image shapes.

Further, the positions and the numbers of the projection portions 24e, the holes 24f, the projections 41h, and the like are not limited them. In addition, the ribs 41g are not essential.

The description will now return to FIG. 1. The lower plate 25 is provided at the end on the lower side of the filtration member 21, the outer tube 22, and the inner tube 23. The outflow portion 13 of the filter case 10 is inserted into a hollow portion of the lower plate 25.

The lid body 30 is provided on the outside of the tank. The lid body 30 is provided on the filter case 10, the filter element 20 (here, the upper plate 24), and the gripping member 40 so as to cover an opening of the upper end surface of the filter case 10.

The lid body 30 primarily includes a mounting portion 31, a lid body 32, and a cover 33.

The mounting portion 31 has a substantially tubular shape and is fixed to the filter case 10 or the tank with a screw or the like.

The lid body 32 is a substantially thick plate-shaped member and provided so as to cover a hollow portion of the mounting portion 31 from the upper side of the mounting portion 31. The lid body 32 is fixed to the mounting portion 31 with a screw 58. A sealing member (not illustrated) that prevents a leakage of hydraulic oil is provided between the mounting portion 31 and the lid body 32.

The lid body 32 primarily includes a flange portion 32a and a tubular portion 32b having a substantially tubular shape disposed inside the flange portion 32a. The flange portion 32a abuts on the top surface of the mounting portion 31, and the tubular portion 32b is inserted into the hollow portion of the mounting portion 31.

A recessed portion 32c into which the handle 42 is inserted is formed on a surface on a lower side of the tubular portion 32b. A recessed portion 32d in which the cover 33 is provided is formed on a surface on the upper side of the tubular portion 32b.

The cover 33 is a substantially plate-shaped member and provided on the upper side of the lid body 32. Note that the lid body 32 and the cover 33 may be a single member.

The chain double-dashed line arrows in FIG. 1 indicate the flow of hydraulic oil. The hydraulic oil before filtration flows from the inflow portion 12 into the space S1. The hydraulic oil is filtered in the filtration member 21 and flows into the space S2. After that, the hydraulic oil flows out from the outflow portion 13 to a space outside the filter case 10.

Since the filter element 20 gradually decreases a filtration capacity through filtration of hydraulic oil, replacement to the new filter element 20 is required periodically or as necessary. A procedure of the replacement will be described below.

First, when the lid body 30 (here, the lid body 32 and the cover 33) is removed from the filter case 10, the filter element 20 and the gripping member 40 are exposed from the opening on the upper side of the filter case 10. Accordingly, a user grips the handle 42 of the gripping member 40 to pull up the filter element 20 and the gripping member 40. Since the filter element 20 and the gripping member 40 are integrated with the holding ring 54, the filter element 20 and the gripping member 40 are pulled up together from inside the filter case 10.

Once the filter element 20 and the gripping member 40 are removed from the filter case 10, the holding ring 54 is removed from the upper plate 24. Next, the gripping member 40 is removed from the upper plate 24. This removes the filter element 20 that has already been used. The gripping member 40 and the holding ring 54 are used again.

The gripping member 40 removed from the filter element 20 that has already been used is mounted on the unused new filter element 20, and the holding ring 54 removed from the filter element 20 that has already been used is mounted on the upper plate 24 of the new filter element 20.

Note that during the replacement of the filter element 20, the user of the filter element 20 visually confirms the holes 24f and the projections 41h. Since the user easily recognizes the characters relatively, the holes 24f and the projections 41h are desirably formed in a shape that can be visually confirmed as characters.

According to the present embodiment, it is possible to prevent the use of the filter element other than the genuine filter element 20, a non-genuine product.

Note that in the present embodiment, as a measure for prevention of mounting of a non-genuine product, a protruding portion may be formed in the projection portions 24e, and a recessed portion having a shape corresponding to the protruding portion may be provided in the gripping member 40.

Second Embodiment

Figure 5:
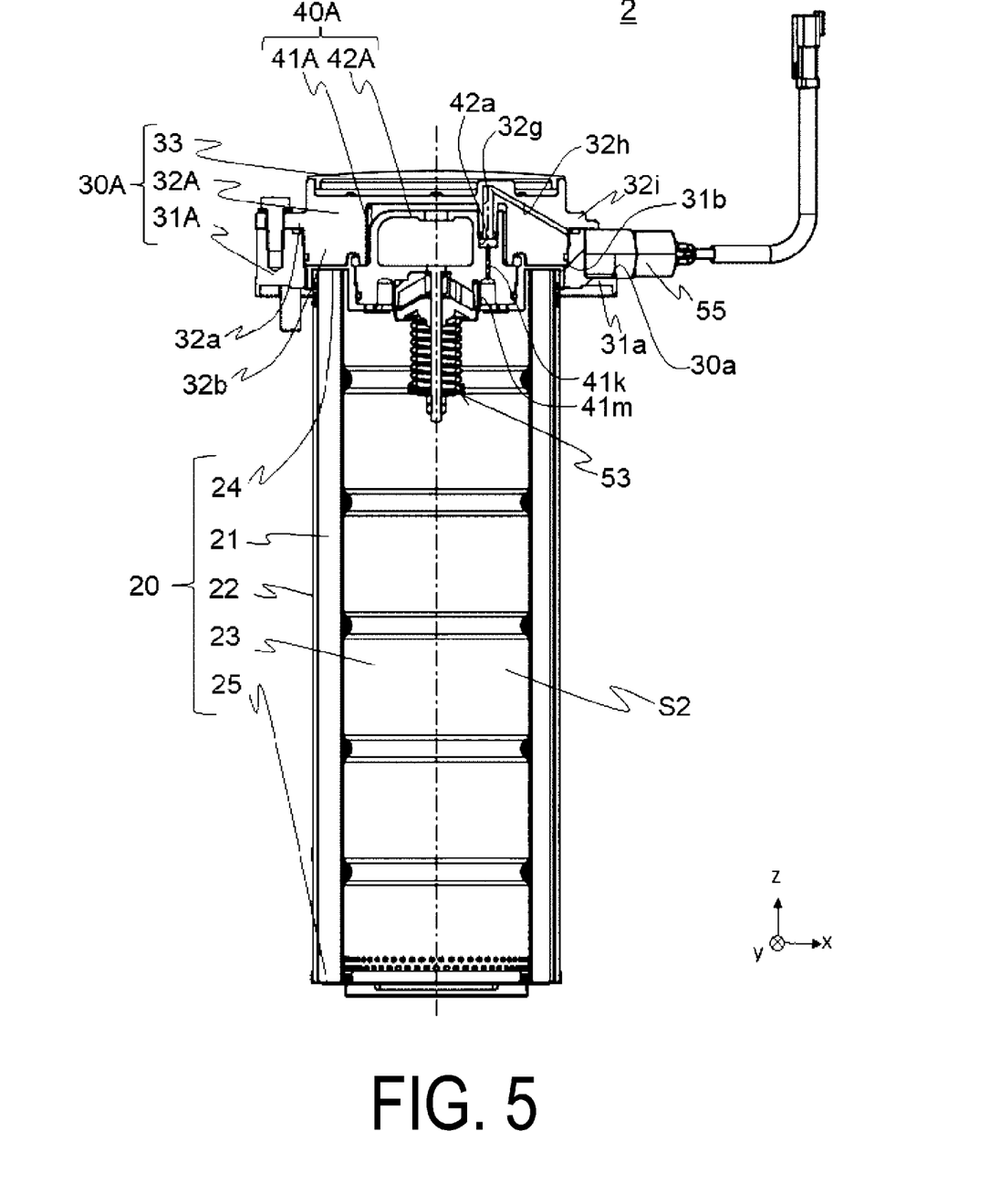
FIG. 5 is a cross-sectional view illustrating an outline of a filter device 2.

FIG. 5 is a cross-sectional view illustrating an outline of a filter device 2 according to the second embodiment. In FIG. 5, hatching for indicating a cross section is omitted. The same configurations as those in the first embodiment are denoted by the same reference signs, and description of the configurations is omitted.

The filter device 2 primarily includes the filter case 10 (not illustrated in FIG. 5), the filter element 20, a lid body 30A, and a gripping member 40A.

The lid body 30A primarily includes a mounting portion 31A, a lid body 32A, and the cover 33. The gripping member 40A is a member mounted on the upper plate 24, and primarily includes a body portion 41A and a handle 42A.

The mounting portion 31A has a protrusion portion 31a that protrudes outward. Also, the lid body 32A has a protrusion portion 32i that protrudes outward. A differential pressure sensor 55 is provided in a space 30a formed by the protrusion portion 31a and the protrusion portion 32i. Furthermore, the mounting portion 31A has a hole 31b extending in the radial direction, and the hole 31b communicates between the space 30a and the space S1 (see FIG. 1).

Figure 6:
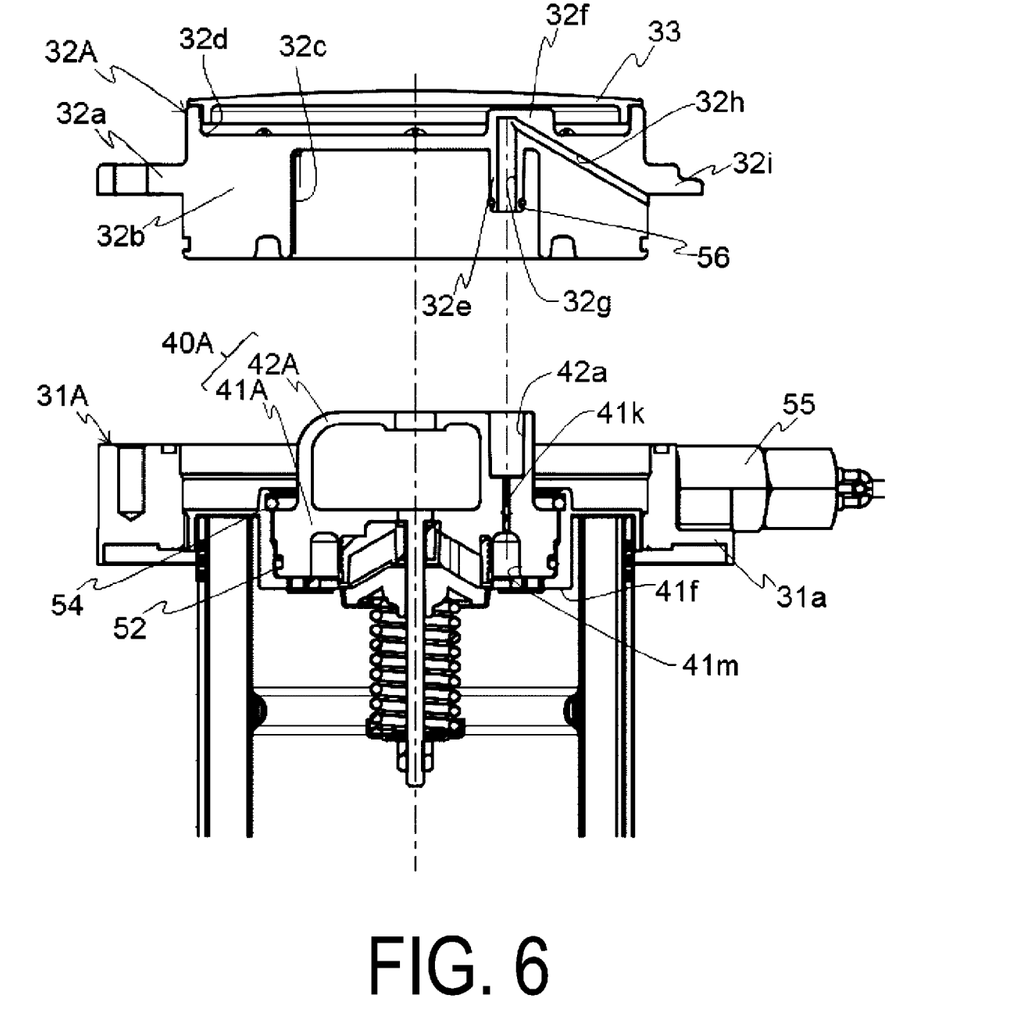
FIG. 6 is a cross-sectional view of a mounting portion, a lid body, and a gripping member.

FIG. 6 is a cross-sectional view of the mounting portion 31A, the lid body 32A, and the gripping member 40A. In FIG. 6, hatching for indicating a cross section is omitted. A recessed portion 41m protruding upward from the lower surface 41f is provided in the body portion 41A, and a recessed portion 42a protruding downward is provided in the handle 42A. Further, a hole 41k that connects the recessed portion 41m and the recessed portion 42a is provided in the gripping member 40A. Note that the hole 41k may be open to the bottom surface of the recessed portion 42a or may be open to a side surface in the vicinity of the bottom surface of the recessed portion 42a. Additionally, the recessed portion 41m may have an inner diameter same as that of the hole 41k.

The lid body 32A has a protruding portion 32e provided to protrude from the bottom surface of the recessed portion 32c, and the lid body 32A has a protruding portion 32f provided to protrude from the bottom surface of the recessed portion 32d. In the protruding portion 32e and the protruding portion 32f, a hole 32g that opens to the distal end of the protruding portion 32e is formed. In addition, a hole 32h having both ends opening to the hole 32g and an outer peripheral surface of the tubular portion 32b is formed in the tubular portion 32b.

The protruding portion 32e is inserted into the recessed portion 42a. As such, a positional relationship between the lid body 30 (here, the lid body 32A) and the gripping member 40 (here, the handle 42A) can be made constant, and the recessed portion 41m, the hole 41k, the recessed portion 42a, the hole 32g, and the hole 32h can be one hole.

A sealing member 56 that prevents a leakage of hydraulic oil is provided between the protruding portion 32e and the recessed portion 42a.

The description will now return to FIG. 5. Since the recessed portion 41m, the hole 41k, the recessed portion 42a, the hole 32g, and the hole 32h communicate between the space S2 and the space 30a, by providing the differential pressure sensor 55 in the space 30a, a difference between an inner pressure of the filter case 10 and an outer pressure of the case is detected.

According to the present embodiment, the differential pressure between the space 51 and the space S2 can be detected by the differential pressure sensor 55 provided on the lid body 30A while preventing use of a component other than the genuine product.

The embodiments of the invention are described above in detail with reference to the drawings. However, specific configurations are not limited to the embodiments and also include changes in design or the like without departing from the gist of the invention. A person skilled in the art can appropriately change, add, and convert each element in the embodiments.

Additionally, in the present invention, "substantially" is a concept not only including the case of being strictly the same, but also including an error and deformation to the extent that a loss of identity does not occur. For example, the term "substantially same" is not limited to the case of being strictly same, but is a concept that includes an error to the extent not losing sameness. Further, for example, when simply expressed as "same," it also includes a case of substantially same, in addition to the case of being strictly same. Additionally, in the present invention, "vicinity" means to include a region in a certain range (the range can be determined arbitrarily) near a reference position. For example, the case of expressing "in the vicinity of A" is a concept that a region in a certain range near A may include A or may not include A.

REFERENCE SIGNS LIST 1, 2: Filter device
10: Filter case
11: Tank body
12: Inflow portion
13: Outflow portion
20: Filter element
21: Filtration member
22: Outer tube
23: Inner tube
24: Upper plate
24a: Plate-like portion
24b: Tubular portion
24c: Tubular portion
24d: Housing portion
24e: Projection portion
24f: Hole
25: Lower plate
30, 30A: Lid body
30a: Space
31, 31A: Mounting portion
31a: Protrusion portion
31b: Hole
32, 32A: Lid body
32a: Flange portion
32b: Tubular portion
32c: Recessed portion
32d: Recessed portion 32e: Protruding portion
32f: Protruding portion
32g: Hole
32h: Hole
32i: Protrusion portion
33: Cover
40, 40A: Gripping member
41, 41A: Body portion
41a: Top surface
41b: Outer peripheral surface
41c: Groove
41e: Hole
41f: Lower surface
41g: Rib
41h: Projection
41k: Hole
41m: Recessed portion
42, 42A: Handle
42a: Recessed portion
51: Sealing member
52: Sealing member
53: Valve
54: Holding ring
55: Differential pressure sensor
56: Sealing member
58: Screw

The invention claimed is:

1. A filter device comprising:
a filter element;
a filter case having a bottomed tubular shape that internally includes the filter element;
a lid body provided on the filter element and the filter case to cover an opening in an upper portion of the filter case; and
a differential pressure sensor provided on the lid body, wherein
the lid body has a mounting hole where the differential pressure sensor is provided;
the lid body has a first hole having one end opening to the mounting hole and a second hole;
the gripping member has a third hole that communicates between a space inside the inner tube and the first hole; and
the second hole communicates between a space outside the filter element and inside the inner tube of the filter case and the mounting hole,
wherein the filter element comprises:
a filtration member having a hollow cylindrical shape that has openings at both ends;
an inner tube provided inside the filtration member;
an upper plate provided on upper ends of the filtration member and the inner tube, the upper plate including a tubular portion having a substantially tubular shape along the inner tube;
a gripping member mounted on the upper plate, the gripping member including a body portion having a thick plate shape and a handle, the body portion being inserted into a hollow portion of the tubular portion, the handle being provided on a top surface of the body portion;
a valve provided on the body portion, the valve being disposed inside the inner tub;
a sealing member provided between the upper plate and the gripping member, and
wherein:
the upper plate includes a rib and a hole, the rib is formed protruding inward in a radial direction from an inner periphery of the tubular portion, and
the hole is formed in the rib; and
the gripping member has a protrusion portion protruding downward from the body portion, and the protrusion portion is inserted into the hole.

2. The filter device according to claim 1,
wherein the filter element further comprises:
a holding ring having elasticity formed by bending a metallic rod into an annular shape, wherein:
the upper plate includes a housing portion in which the holding ring is provided;
the holding ring is provided in the housing portion with the body portion inserted into the tubular portion; and
the holding ring abuts on a top surface of the body portion.

3. The filter device according to claim 2, wherein
the lid body has a protruding portion internally having a hole that communicates with the first hole;
the handle has a recessed portion into which the protruding portion is inserted; and
the second hole has one end opening to a lower surface of the body portion and the other end opening to a vicinity of a bottom surface of the recessed portion.

4. The filter device according to claim 1, wherein
the lid body has a protruding portion internally having a hole that communicates with the first hole;
the handle has a recessed portion into which the protruding portion is inserted; and
the second hole has one end opening to a lower surface of the body portion and the other end opening to a vicinity of a bottom surface of the recessed portion.

* * * * *